US012757205B2

(12) United States Patent
Pradhan et al.

(10) Patent No.: US 12,757,205 B2
(45) Date of Patent: Oct. 6, 2026

(54) BASE FORMAT FOR PHYSICAL UPLINK CONTROL CHANNEL (PUCCH) POWER CONTROL FOR 5G (STANDALONE (SA) AND NON-STANDALONE (NSA))

(71) Applicant: Parallel Wireless, Inc., Nashua, NH (US)

(72) Inventors: Nuraj Pradhan, Nashua, NH (US); Ori Shmuel, Herzliya (IL)

(73) Assignee: Parallel Wireless, Inc., Nashua, NH (US)

( * ) Notice: Subject to any disclaimer, the term of this patent is extended or adjusted under 35 U.S.C. 154(b) by 281 days.

(21) Appl. No.: 18/362,959

(22) Filed: Jul. 31, 2023

(65) Prior Publication Data

US 2024/0040572 A1 Feb. 1, 2024

Related U.S. Application Data

(60) Provisional application No. 63/393,308, filed on Jul. 29, 2022.

(51) Int. Cl.
*H04W 72/21* (2023.01)
*H04W 72/541* (2023.01)

(52) U.S. Cl.
CPC ......... *H04W 72/21* (2023.01); *H04W 72/541* (2023.01)

(58) Field of Classification Search
CPC ............................ H04W 72/21; H04W 72/541
See application file for complete search history.

(56) References Cited

U.S. PATENT DOCUMENTS

| | | | | |
|---|---|---|---|---|
| 9,363,780 B2 * | 6/2016 | Yang | H04L 1/0026 | |
| 10,075,969 B2 | 9/2018 | Bertrand et al. | | |
| 11,540,260 B1 * | 12/2022 | Krasniqi | H04W 72/542 | |
| 12,376,029 B2 * | 7/2025 | Rao | H04W 24/08 | |
| 2012/0275425 A1 * | 11/2012 | Li | H04W 52/20 | 370/329 |
| 2013/0294390 A1 * | 11/2013 | Yang | H04B 7/0413 | 370/329 |
| 2015/0181533 A1 * | 6/2015 | Chen | H04W 52/146 | 455/522 |
| 2015/0230190 A1 * | 8/2015 | Shin | H04W 72/21 | 370/329 |
| 2015/0304994 A1 * | 10/2015 | Kim | H04L 27/2601 | 370/280 |
| 2022/0078717 A1 * | 3/2022 | Raghavan | H04W 52/242 | |
| 2023/0041095 A1 * | 2/2023 | Zhou | H04L 5/0057 | |

(Continued)

FOREIGN PATENT DOCUMENTS

CN 113037442 A * 6/2021 ........... H04W 72/23

*Primary Examiner* — Umar Cheema
(74) *Attorney, Agent, or Firm* — Michael Y. Saji

(57) ABSTRACT

A method of providing a base format for Physical Uplink Control Channel (PUCCH) power control is disclosed, the method comprising: defining a base format PUCCH based on established relationships with the different formats of PUCCH configured in the network, measuring an acceptable Signal-to-Interference-plus-Noise Ratio (SINR) for PUCCH formats $x \in \{0, \ldots, 4\}$ over varying channel, wherein the PUCCH format with a minimum SINR is defined as the Base format for the PUCCH calculations, calculated by multiplying PUCCH_FORMAT_X with the min of the SINR of each of the measurements of the SINR over each of the PUCCH formats.

20 Claims, 5 Drawing Sheets

(56) References Cited

U.S. PATENT DOCUMENTS

| | | | | |
|---|---|---|---|---|
| 2023/0269669 | A1* | 8/2023 | Jin | H04W 52/24<br>455/522 |
| 2023/0362939 | A1* | 11/2023 | Lidian | H04L 5/006 |

* cited by examiner

BASE FORMAT FOR PHYSICAL UPLINK CONTROL CHANNEL (PUCCH) POWER CONTROL FOR 5G (STANDALONE (SA) AND NON-STANDALONE (NSA))

CROSS-REFERENCE TO RELATED APPLICATIONS

The present application claims the benefit of priority under 35 U.S.C. § 119(e) to U.S. Provisional Patent Application No. 63/393,308, having the same title as the present application and filed Jul. 29, 2022, which is hereby incorporated by reference in its entirety.

This application also hereby incorporates by reference, for all purposes, each of the following U.S. Patent Application Publications in their entirety: US20170013513A1, "Enhanced X2 Protocol." filed Jul. 11, 2016; US20170026845A1, "SON-Controlled DFS," filed Jul. 25, 2016; US20170055186A1, "Cell ID Disambiguation," filed Aug. 18, 2016; US20170070436A1, "RAN for Multimedia Delivery," filed Sep. 8, 2016; US20170077979A1, "Antenna-integrated radio with wireless fronthaul," filed Sep. 12, 2016; US20170019375A1, "Method of Connecting Security Gateway to Mesh Network," filed Sep. 27, 2016; US20170111482A1, "X2 Protocol Programmability," filed Oct. 20, 2016; US20170048710A1, "Virtualization of the Evolved Packet Core to Create a Local EPC," filed Oct. 25, 2016; US20170127409A1, "Elastic Scheduling," filed Oct. 31, 2016; US20170064621A1, "Intelligent Mesh Network Selection," filed Nov. 15, 2016; US20170202006A1, "Inter-Cell Fractional Frequency Reuse Scheduler," filed Jan. 13, 2017; US20170238278A1, "Handling Unresponsive MMEs," filed Feb. 17, 2017; US20170171828A1, "Adjusting Transmit Power Across a Network," filed Feb. 21, 2017; US20170181119A1, "Radio Operation Switch Based on GPS Mobility Data," filed Feb. 28, 2017; US20170273134A1, "IuGW Architecture," filed Mar. 20, 2017; US20170272330A1, "Base Station Grouping for Topology Hiding," filed Mar. 27, 2017; US20170208560A1, "Signal Quality Database," filed Apr. 3, 2017; US20170288813A1, "PHY Error Indication Messaging," filed Apr. 4, 2017; US20170295510A1, "Uplink Measurements for Wireless Systems," filed Apr. 10, 2017; US20170303163A1, "Mitigation of Negative Delay via Half CP Shift," filed Apr. 17, 2017; US20170257133A1, "Antenna-Integrated Radio with Wireless Fronthaul," filed May 16, 2017; and US20200128414A1, "Radio Access Network Dynamic Functional Splits," filed Oct. 16, 2019. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017. This document also hereby incorporates by reference U.S. Pat. No. 9,107,092, "Heterogeneous self-organizing network for access and backhaul," filed Jan. 3, 2014, U.S. Pat. No. 8,867,418, "Methods of incorporating an ad hoc cellular network into a fixed cellular network," filed Feb. 18, 2014, and U.S. Pat. No. 9,232,547, "Methods of incorporating an ad hoc cellular network into a fixed cellular network," filed Jun. 23, 2014 in their entirety. This document also hereby incorporates by reference U.S. patent application Ser. No. 14/822,839, "Congestion and overload reduction," filed Aug. 10, 2015, 15/828427, "Enhanced CSFB," filed Nov. 30, 2017, 18/174580, "O-RAN Compatible Deployment Architecture," filed Feb. 24, 2023, U.S. Pat. App. Pub. Nos. US20170273134A1, "IuGW Architecture," filed Mar. 20, 2017, US20170127409A1, "Elastic Scheduling," filed Oct. 31, 2016, US20200128414A1, "Radio Access Network Dynamic Functional Splits," filed Oct. 16, 2019, and US20230019380A1, "4G/5G Open RAN CU-UP Pool Solution," filed Jul. 18, 2022 in their entirety. Features and characteristics of and pertaining to the systems and methods described in the present disclosure, including details of the multi-RAT nodes and the gateway described herein, are provided in the documents incorporated by reference.

BACKGROUND

The Physical Uplink Control Channel (PUCCH) Power Control is an integral component of a 5G (5G Standalone (SA) and 5G Non-Standalone (NSA)) network that is essential for controlling the power level of the user equipments (UEs) connected to the network. PUCCH is an Uplink Physical Channel that is designed to carry UCI (Uplink Control Information). In 5G NR, PUCCH are placed in almost anywhere in a slot and usually takes up only a few symbols of a slot. This is because unlike LTE PUCCH that is located at the edges of the carrier bandwidth and is designed with fixed duration and timing, NR PUCCH is flexible in its time and frequency allocation. This allows supporting UEs with smaller bandwidth capabilities in an NR carrier and efficient usage of available resources with respect to coverage and capacity.

SUMMARY

The proposed solution of the Base Format for PUCCH Power Control will establish a relationship between all the relevant PUCCH formats in the network. It will then convert all other relevant PUCCH formats to a single Base Format and initiate a single process that will set the UE power such that all the relevant PUCCH formats can be correctly decoded. If all five PUCCH formats are configured in the network, the proposed solution will cut the need to start, manage and maintain five different processes in PUCCH Power Control to just one for Base Format.

In one embodiment, a method is provided for PUCCH power control that includes: receiving a UE Signal-to-Interference-plus-Noise Ratio (SINR) measurement from a UE; determining a PUCCH format appropriate for the UE by, e.g., detecting or selecting a PUCCH format; and, performing a comparison of the SINR for every PUCCH format using a normalized figure. The PUCCH format with the minimum acceptable SINR is defined as the base format for the PUCCH calculations. An effective SINR for each format may be measured, in some embodiments. An effective SINR for each format may be converted to a value that corresponds to the SINR for base format for the PUCCH calculation, in some embodiments. The conversion for the effective SINR may involve performing a format specific offset operation, in some embodiments. The conversion for the effective SINR may use a specific offset based on a PUCCH PowerControl IE from 3GPP TS 38.331, in some embodiments. The conversion for the effective SINR may be a Effective SINR for the base PUCCH format, in some embodiments.

In another embodiment, a method is provided for providing a base format for PUCCH power control that includes: defining a base format PUCCH based on established relationships with the different formats of PUCCH configured in the network; measuring an acceptable SINR, $SINR_{PUCCH\_FORMAT\_x}$, for PUCCH formats $x \in \{0, \ldots, 4\}$ over varying channel, wherein the PUCCH format with the minimum $SINR_{PUCCH\_FORMAT\_x}$ is defined as the base format for the PUCCH calculations:

$$\text{PUCCH\_FORMAT\_BASE} = \text{PUCCH\_FORMAT\_X with } SINR_{fx} = SINR_{fbase} \text{ where, } SINR_{fbase} = \min\{SINR_{f0}, SINR_{f1}, SINR_{f2}, SINR_{f3}, SINR_{f4}\}.$$

DETAILED DESCRIPTION

Figure 1:
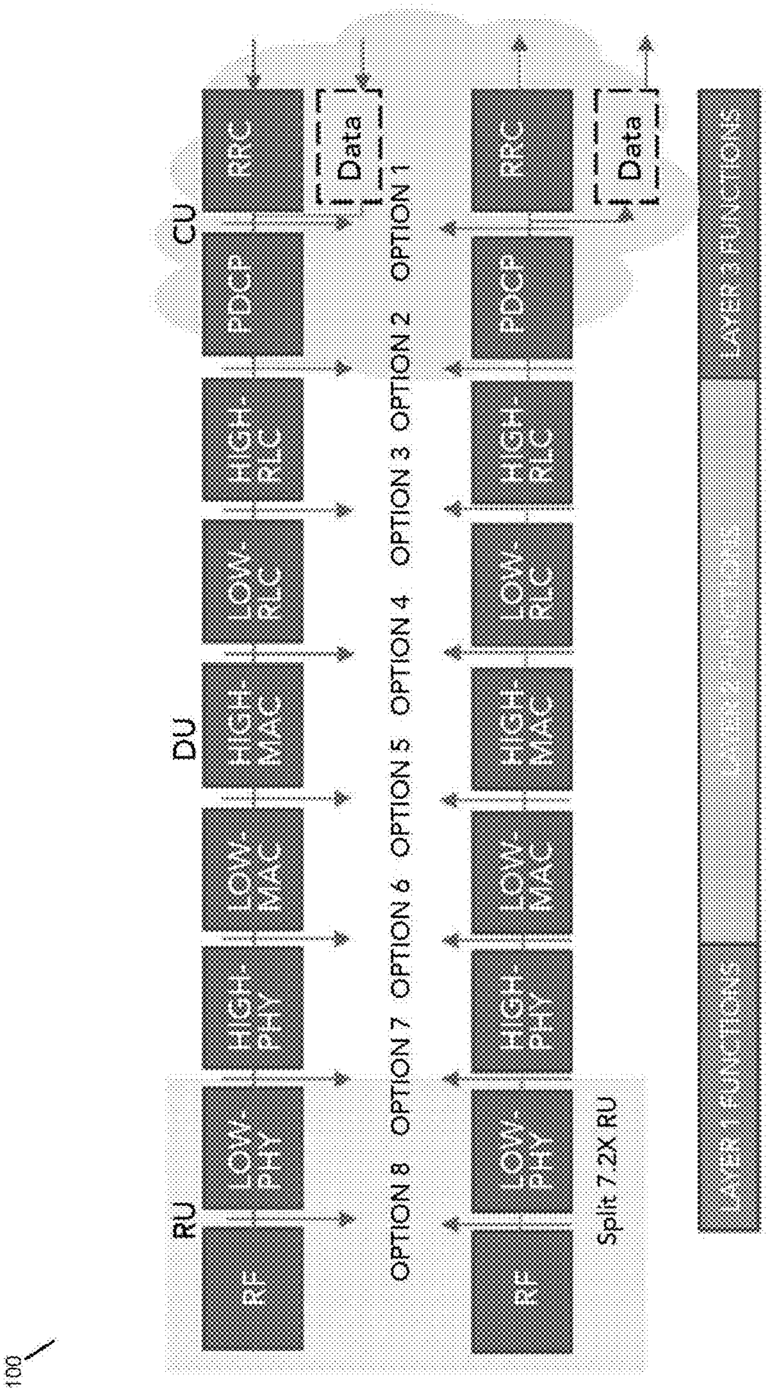
FIG. 1 (PRIOR ART)
FIG. 1 is a schematic diagram of 3GPP functional splits, as known in the prior art.

The 3GPP has defined five PUCCH formats, each suitable for different type of applications, network coverage and capacity. For each of the different PUCCH formats configured in the network, the PUCCH Power Control will have to configure individual processes to guarantee that the said PUCCH Format received are correctly decoded. Each process will also have to ensure that the UE is transmitting the PUCCH at the power level such that the different PUCCH formats are received in the gNodeB at the acceptable SINR level for that PUCCH format. Additionally, even within the same PUCCH format different payload size could lead to different PUCCH Power Control requirements. If the 5G network is configured with flexibility of supporting different type of applications or payloads, the number of processes the PUCCH Power Control must support can be many.

The PUCCH power control scheme aims to maintain the power level of a UE such that the Base Station receives the PUCCH at an acceptable power level. The acceptable power level is set at a Signal to Interference plus Noise Ratio (SINR) required for PUCCH detection with a defined BLER performance in the wireless channel. So, the PUCCH power control will control the interference, mainly towards the other cells, and reduce the UE power consumption.

The PUCCH power control calculates the transmit power (for transmission occasion i) for UE based on the 3GPP TS 38.213 with the following equation:

$$P_{PUCCH}(i)[\text{dBm}] = \min\begin{cases} P_{CMAX}(i) \\ \{P_{0\_PUCCH} + 10\log_{10}(2^{\mu} M_{RB}^{PUCCH}(i)) + PL + \\ \Delta_{F\_PUCCH}(F) + \Delta_{TF}(i) + g(i, l) \end{cases} \quad \text{(i)}$$

where, $P_{CMAX}(i)$ is the maximum power of the UE $P_{0\_PUCCH}$ is the Nominal UE transmit power μ is the Subcarrier Spacing (SCS) configured $$M_{RB}^{PUCCH}$$

is the allocated Resource Blocks for PUCCH

PL is the Pathloss extimated in dB $\Delta_{F\_PUCCH}(F)$ is the PUCCH Format-specific Offset $\Delta_{TF}$ is an additional power gain depending on number of transmitted bits and number of symbols g(i, l) is the PUCCH Closed Loop Power Control component for adjustment state l.

The detailed explanation for a specific active Bandwidth Part, Carrier and Serving Cell is given in 3GPP TS 38.213, hereby incorporated by reference.

The g(i, l) represents the CLPC calculation for adjustment state l. The Base station transmits the TPC commands to the UE indicating the adjustment state the UE is configured to. The TPC commands are used to update UE with transmission power in a Close Loop Power Control (CLPC).

In accumulation mode, the PUCCH closed loop component is given by:

$$g(i, l) = g(i - i_0, l) + \sum_{m=0}^{C} \delta_{PUCCH}(m, l) \text{ where } \sum_{m=0}^{C} \delta_{PUCCH}(m, l)$$

is the $m^{th}$ TPC command for adjustment state l received from the last transmission $i - i_0$. $\delta_{PUCCH}$ is presented in Table 1.

TABLE 1

Interpretation of TPC commands for PUCCH power control

| TPC command | Accumulated $\delta_{PUCCH}$ |
|---|---|
| 0 | −1 dB |
| 1 | 0 dB |
| 2 | 1 dB |
| 3 | 3 dB |

If the TPC command leads to UE power above the maximum power or below the minimum power, then the UE shall handle these cases in the following manner [3GPP TS 38.213, hereby incorporated by reference]:

If the UE reaches maximum power for active UL BWP, carrier f of primary cell at PUCCH transmission occasion $i-i_0$ and $$\sum_{m=0}^{C} \delta_{PUCCH}(m, l) \geq 0, \text{ then } g(i, l) = g(i - i_0, l)$$

If the UE reaches minimum power for active UL BWP, carrier f of primary cell at PUCCH transmission occasion $i-i_0$ and $$\sum_{m=0}^{C} \delta_{PUCCH}(m, l) \leq 0, \text{ then } g(i, l) = g(i - i_0, l)$$

The maximum power of the UE is usually known to the BS from specification of operating in a certain band. In addition to that, the UE reports the $P_{CMAX}$ in the PHR. The minimum power of the UE (which is a function of the BW) is given in 3GPP TS 38.101.

The TPC commands for the PUCCH are provided on the PDCCH using DCI Format 0_0, 0_1 or 2_2.

PUCCH can be configured in five different formats defined in 3GPP TS 38.211, which is hereby incorporated by reference.

TABLE 2

PUCCH Formats - a synopsis

| Format | Payload | Duration | Resource Blocks | Waveform | Modulation | Code Multiplexing |
|---|---|---|---|---|---|---|
| 0 | SR, HARQ | Short | 1 | CP-OFDM | — | 12 cyclic shifts |
| 1 | ACK | Long | | | BPSK or QPSK | 12 cyclic shifts & 1 to 7 OCC |
| 2 | SR, HARQ | Short | 1 to 16 | | QPSK | None |
| 3 | ACK, CSI | Long | {1-7, 8-10, 12, 15, 16} | DFT-S-OFDM | π/2 BPSK or QPSK | |
| 4 | | Long | 1 | | | 2 or 4 OCC |

Two of the formats, Formats 0 and 2, occupy at most only 2 OFDM symbol and are referred to as short formats. Three of the formats, Formats 1, 3 and 4, can occupy from 4 to 14 OFDM symbols and are referred to as long formats. PUCCH Format 0 are based on sequence and does not require modulation scheme. So, except for Format 0, all the other PUCCH formats use Demodulation Reference Signal (DMRS) when decoding PUCCH payload. The PUCCH formats can use very different configuration of payload size, waveform, modulation scheme and multiplexing capabilities.

Therefore, the SINR required to receive the PUCCH at the Base Station so that it can be decoded with acceptable BLER performance for different PUCCH Formats can be very different. This means that for every single configuration of PUCCH and the size of the payload, a SINR target defined here as TargetSINR needs to be measured or defined.

Additionally, a smoothing process is employed to control the drastic changes of SINR due to channel conditions so that the system can react appropriately. In PUCCH power control, SINR smoothing need to be done for each PUCCH formats with their own individual coefficients.

A Base Format is defined for PUCCH that will establish relationships with the different formats of PUCCH configured in the network. So instead of maintaining individual SINR averages or TargetSINR values for all relevant PUCCH Formats (0 to 4), the PUCCH Power Control will only need to maintain a single SINR average for the said Base Format.

The acceptable SINR, $SINR_{PUCCH\_FORMAT\_x}$, for PUCCH formats $x \in \{0, \ldots, 4\}$ over varying channel will be measured and simulated to satisfy a BLER performance. The PUCCH format with the minimum $SINR_{PUCCH\_FORMAT\_x}$ will be defined as the Base format for the PUCCH calculations:

$$PUCCH\_FORMAT\_BASE = PUCCH\_FORMAT\_X \text{ with } SINR_{fx} = SINR_{fbase}$$

where, $SINR_{fbase} = \min\{SINR_{f0}, SINR_{f1}, SINR_{f2}, SINR_{f3}, SINR_{f4}\}$ With reference to the PUCCH_FORMAT_BASE, the deltaF-PUCCH-fx for $x \in \{0, \ldots, 4\}$ will be calculated according to the following equation:

$$\Delta_{F_{PUCCH}}^{fx} = SINR_{fx} - SINR_{fbase} \text{ format } x \in \{0 \ldots 4\}$$

The $$\Delta_{F_{PUCCH}}^{fx}$$

will then be configured for the format specific offset for PUCCH-PowerControl IE (3GPP TS 38.331):

```
PUCCH-PowerControl ::=      SEQUENCE {
deltaF-PUCCH-f0     INTEGER (−16..15)     OPTIONAL, -- Need R
deltaF-PUCCH-f1     INTEGER (−16..15)     OPTIONAL, -- Need R
deltaF-PUCCH-f2     INTEGER (−16..15)     OPTIONAL, -- Need R
deltaF-PUCCH-f3     INTEGER (−16..15)     OPTIONAL, -- Need R
deltaF-PUCCH-f4     INTEGER (−16..15)     OPTIONAL, -- Need R
p0-Set     SEQUENCE (SIZE (1..maxNrofPUCCH-P0-PerSet)) OF P0-PUCCH     OPTIONAL, -- Need M
```

-continued

```
  pathlossReferenceRSs            SEQUENCE (SIZE (1..maxNrofPUCCH-PathlossReferenceRSs)) OF PUCCH-
PathlossReferenceRS
                                                                                        OPTIONAL, -- Need M
  twoPUCCH-PC-AdjustmentStates    ENUMERATED {twoStates}                                OPTIONAL, -- Need S
  ...,
  [[
  pathlossReferenceRSs-v1610      SetupRelease { PathlossReferenceRSs-v1610 }           OPTIONAL, -- Need M
  ]]
}
```

The Effective SINR for the PUCCH Formats (0 to 4) measured and then this ReportedEffSINR$_{fx}$(t) value will be converted to the PUCCH_FORMAT_BASE as follows:

$$EffSINR_{fbase}(t) = ReportedEffSINR_{fx}(t) - \Delta^{fx}_{F_{PUCCH}} \text{ [dB]}$$

The PUCCH Closed Loop Power Control will then generate a TPC command based on the how far the reported PUCCH SINR is off the Target SINR needed for decoding the PUCCH. If the reported PUCCH SINR is lower than Target SINR, TPC Command 2 and 3 are sent to increase the UE transmit power (depending on the PUCCH Closed Loop Power Control Algorithm). If the reported PUCCH SINR is higher than necessary, TPC command 0 is sent to decrease the UE transmit power. This will be discussed again with respect to FIG. 4.

Radio Unit Functional Splits

FIG. 1 shows a schematic diagram of radio functional splits showing split 7.2X RU as well as other splits. The use of these functional splits is encouraged by ORAN.

5G New Radio (NR) was designed to allow for disaggregating the baseband unit (BBU) by breaking off functions beyond the Radio Unit (RU) into Distributed Units (DUs) and Centralized Units (CUs), which is called a functional split architecture. This concept has been extended to 4G as well.

RU: This is the radio hardware unit that coverts radio signals sent to and from the antenna into a digital signal for transmission over packet networks. It handles the digital front end (DFE) and the lower PHY layer, as well as the digital beamforming functionality. 5G RU designs are supposed to be inherently intelligent, but the key considerations of RU design are size, weight, and power consumption. Deployed on site.

DU: The distributed unit software that is deployed on site on a COTS server. DU software is normally deployed close to the RU on site and it runs the RLC, MAC, and parts of the PHY layer. This logical node includes a subset of the eNodeB (eNB)/gNodeB (gNB) functions, depending on the functional split option, and its operation is controlled by the CU.

CU: The centralized unit software that runs the Radio Resource Control (RRC) and Packet Data Convergence Protocol (PDCP) layers. The gNB consists of a CU and one DU connected to the CU via Fs-C and Fs-U interfaces for CP and UP respectively. A CU with multiple DUs will support multiple gNBs. The split architecture lets a 5G network utilize different distributions of protocol stacks between CU and DUs depending on midhaul availability and network design. It is a logical node that includes the gNB functions like transfer of user data, mobility control, RAN sharing (MORAN), positioning, session management etc., except for functions that are allocated exclusively to the DU. The CU controls the operation of several DUs over the midhaul interface. CU software can be co-located with DU software on the same server on site.

When the RAN functional split architecture (FIG. 4) is fully virtualized, CU and DU functions runs as virtual software functions on standard commercial off-the-shelf (COTS) hardware and be deployed in any RAN tiered datacenter, limited by bandwidth and latency constraints.

Option 7.2 (shown) is the functional split chosen by the O-RAN Alliance for 4G and 5G. It is a low-level split for ultra-reliable low-latency communication (URLLC) and near-edge deployment. RU and DU are connected by the eCPRI interface with a latency of ~100 microseconds. In O-RAN terminology, RU is denoted as O-RU and DU is denoted as O-DU. Further information is available in US20200128414A1, hereby incorporated by reference in its entirety.

Figure 2:
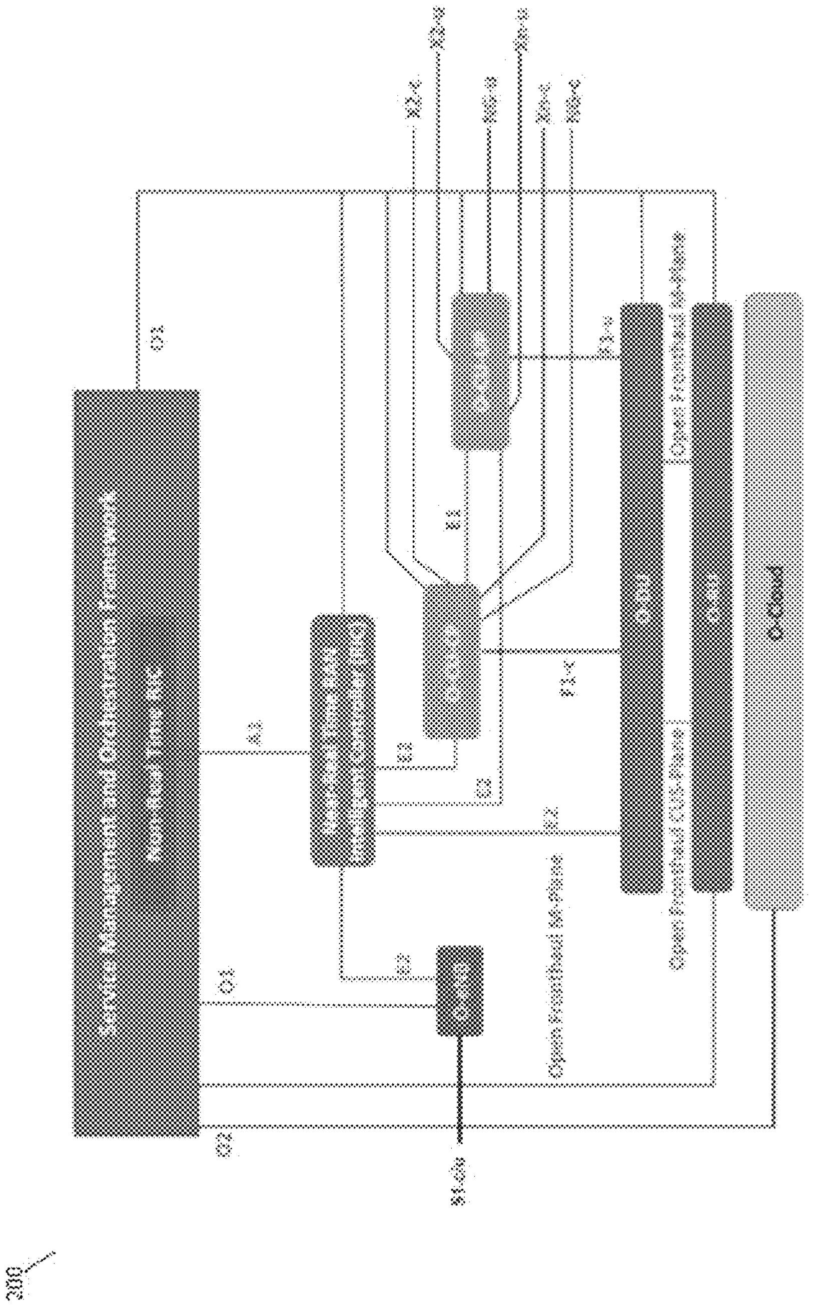
FIG. 2 (PRIOR ART)
FIG. 2 is a schematic diagram of an Open RAN 4G/5G deployment architecture, as known in the prior art.

FIG. 2 is a schematic diagram of an Open RAN 4G/5G deployment architecture, as known in the prior art. The O-RAN deployment architecture includes an O-DU and O-RU, as described above with respect to FIG. 1, which together comprise a 5G base station in the diagram as shown. The O-CU-CP (central unit control plane) and O-CU-UP (central unit user plane) are ORAN-aware 5G core network nodes. An ORAN-aware LTE node, O-eNB, is also shown. As well, a near-real time RAN intelligent controller is shown, in communication with the CU-UP, CU-CP, and DU, performing near-real time coordination. As well, a non-real time RAN intelligent controller is shown, receiving inputs from throughout the network and specifically from the near-RT RIC and performing service management and orchestration (SMO), in coordination with the operator's network (not shown). While the ORAN network concept does not teach any integration of 2G, 3G or 2G/3G/4G DU or RU, this is contemplated by the present application.

Figure 3:
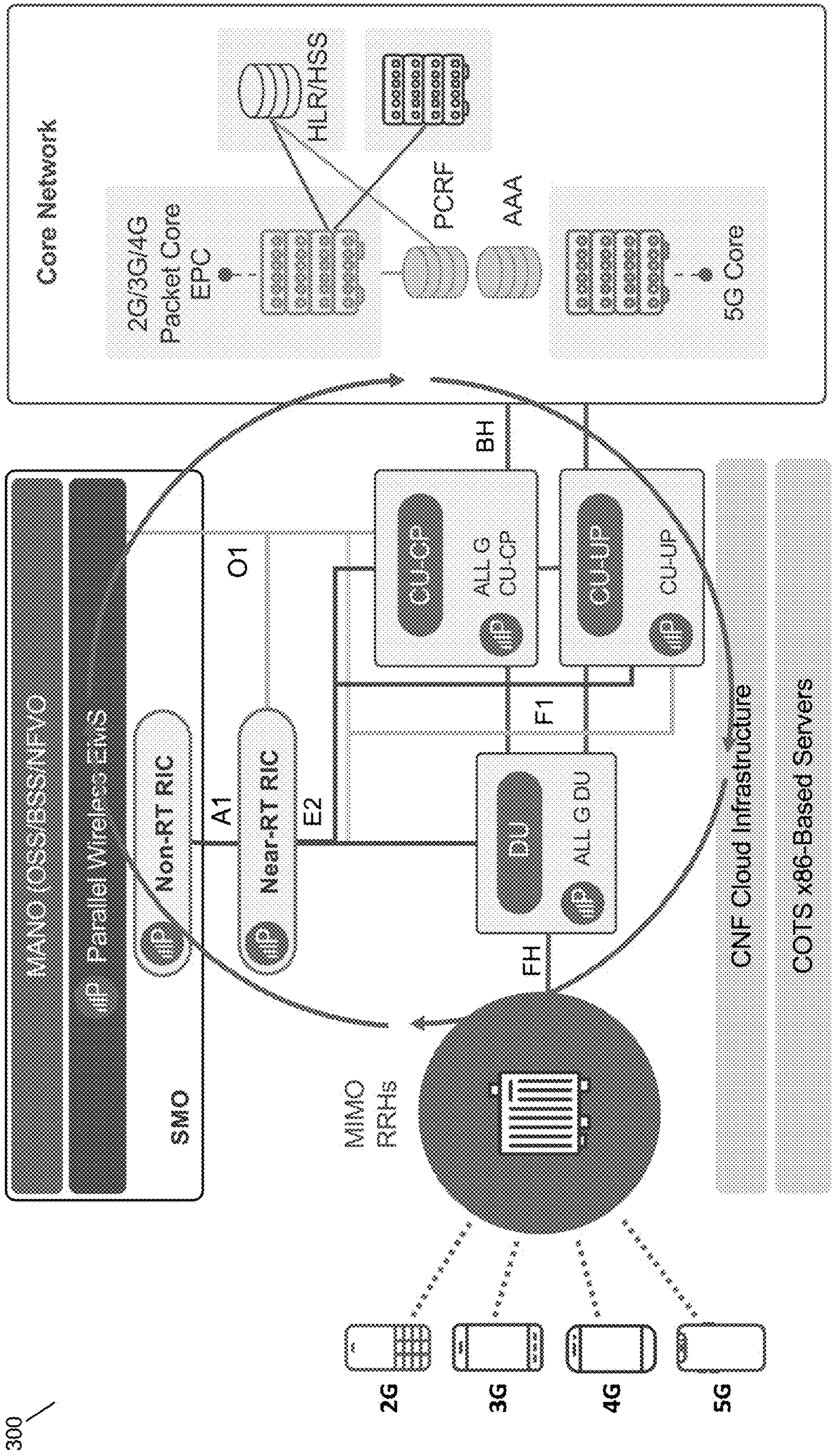
FIG. 3 is a schematic diagram of a multi-RAT RAN deployment architecture, in accordance with some embodiments.

FIG. 3 is a schematic diagram of a multi-RAT RAN deployment architecture, in accordance with some embodiments. Multiple generations of UE are shown, connecting to RRHs that are coupled via fronthaul to an all-G Parallel Wireless DU. The all-G DU is capable of interoperating with an all-G CU-CP and an all-G CU-UP. Backhaul may connect to the operator core network, in some embodiments, which may include a 2G/3G/4G packet core, EPC, HLR/HSS, PCRF, AAA, etc., and/or a 5G core. In some embodiments an all-G near-RT RIC is coupled to the all-G DU and all-G CU-UP and all-G CU-CP. Unlike in the prior art, the near-RT RIC is capable of interoperating with not just 5G but also 2G/3G/4G.

The all-G near-RT RIC may perform processing and network adjustments that are appropriate given the RAT. For example, a 4G/5G near-RT RIC performs network adjustments that are intended to operate in the 100 ms latency window. However, for 2G or 3G, these windows may be extended. As well, the all-G near-RT RIC can perform configuration changes that takes into account different network conditions across multiple RATs. For example, if 4G is becoming crowded or if compute is becoming unavailable, admission control, load shedding, or UE RAT reselection may be performed to redirect 4G voice users to use 2G instead of 4G, thereby maintaining performance for users. As well, the non-RT RIC is also changed to be a near-RT RIC, such that the all-G non-RT RIC is capable of performing network adjustments and configuration changes for individual RATs or across RATs similar to the all-G near-RT RIC. In some embodiments, each RAT can be supported using processes, that may be deployed in threads, containers, virtual machines, etc., and that are dedicated to that specific RAT, and, multiple RATs may be supported by combining them on a single architecture or (physical or virtual) machine. In some embodiments, the interfaces between different RAT processes may be standardized such that different RATs can be coordinated with each other, which may involve interworking processes or which may involve supporting a subset of available commands for a RAT, in some embodiments.

FIG. 3 also shows a radio tower with a remote radio head (RRH) supporting multiple RATs, 2G/3G/4G/5G, but without requiring four generations of radio base stations to be deployed separately in hardware. Instead, one or more software-upgradable, remotely configurable base stations is coupled to radio heads and filters that are able to operate on the appropriate frequencies for 2G, 3G, 4G, and 5G RATs. The multiple BBUs located at the bottom of the tower in the prior art have been replaced with one or more vBBUs, baseband units that are rearchitected to use modern virtualization technologies. FIG. 3 can be enabled using a technology like CPRI or eCPRI, which enables digitization and transfer of radio I/Q samples for further processing at a BBU or vBBU.

Where virtualization is described herein, one having skill in the cloud technology arts would understand that a variety of technologies could be used to provide virtualization, including one or more of the following: containers, Kubernetes, Docker, hypervisors, virtual machines, hardware virtualization, microservices, AWS, Azure, etc. In a preferred embodiment, containerized microservices coordinated using Kubernetes are used to provide baseband processing for multiple RATs as deployed on the tower.

The inventors have appreciated that the use of the 3GPP model for functional splits is flexible and may be used to provide deployment flexibility for multiple RATs, not just 5G. Functional splits can be used in conjunction with cloud and virtualization technology to perform virtualization of, e.g., the RU, DU, and CU of not just 5G but also 4G, 3G, 2G, etc. This enables the use of commodity off-the-shelf servers, software-defined networking that can be rapidly upgraded remotely, and lower power requirements by using modern hardware compared to legacy hardware.

Figure 4:
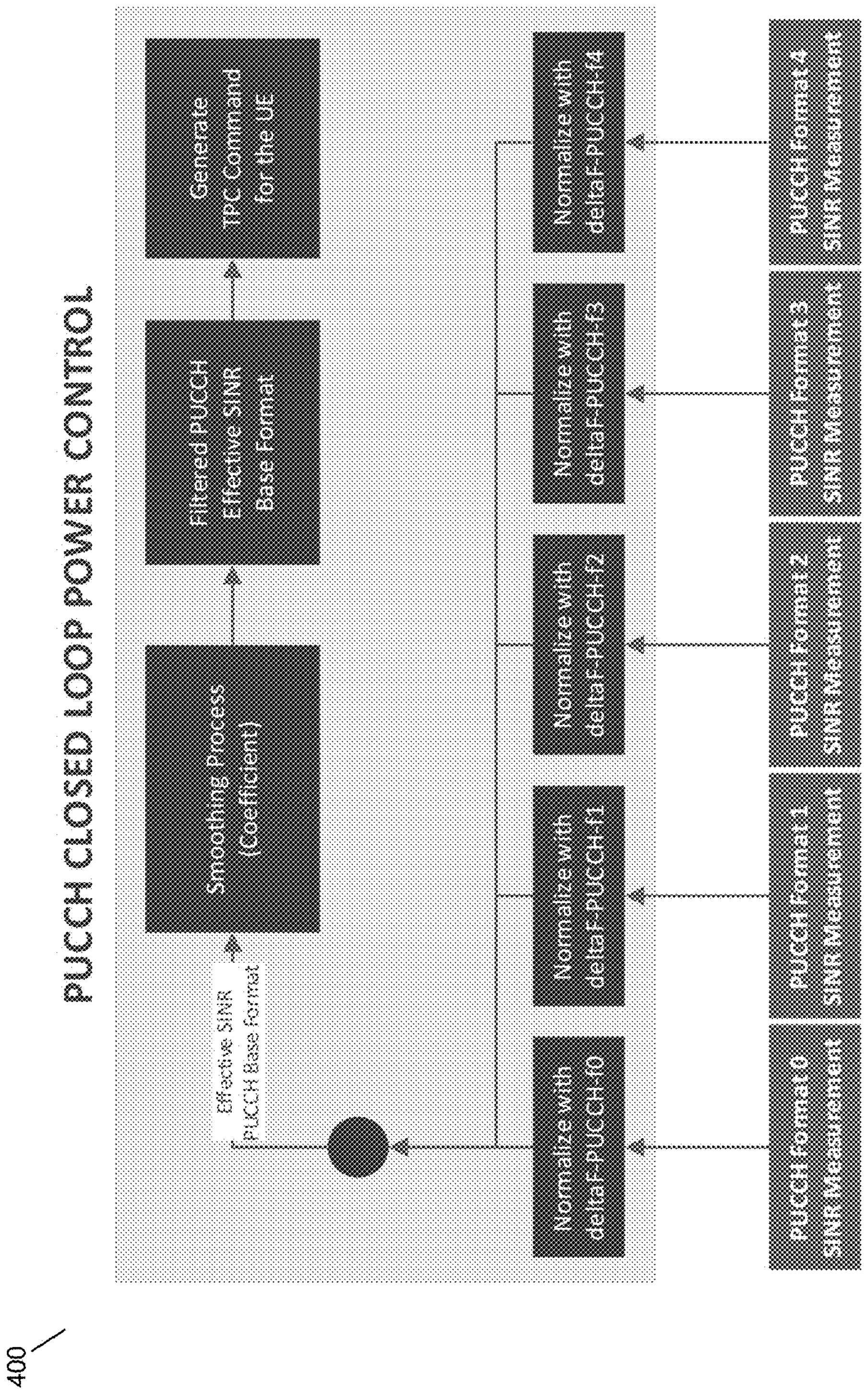
FIG. 4 is an architecture diagram of the proposed PUCCH Closed Loop Power Control, in accordance with some embodiments.

FIG. 4 is an architecture diagram of the proposed PUCCH Closed Loop Power Control, in accordance with some embodiments. Base format conversion is shown as follows. For each of the supported PUCCH formats (here, formats 0, 1, 2, 3, 4 are shown), a SINR Measurement is performed by the UE and is reported to the base station. Next, this raw SINR Measurement is normalized using a deltaF-PUCCH-fx function, calculated as described above, into a value that is called the Effective SINR for the base PUCCH format, $EffSINR_{fbase}(t)$. Next, a smoothing coefficient may be applied. Next, the filtered (smoothed) PUCCH can be compared with the target SINR needed for decoding PUCCH. If the reported PUCCH SINR is lower than desired, TPC Command 2 and 3 are sent to increase the UE transmit power (depending on the PUCCH Closed Loop Power Control Algorithm). If the reported PUCCH SINR is higher than necessary, TPC command 0 is sent to decrease the UE transmit power. This algorithm uses the same comparison for every PUCCH format, in other words, by performing a prior normalization step.

Figure 5:
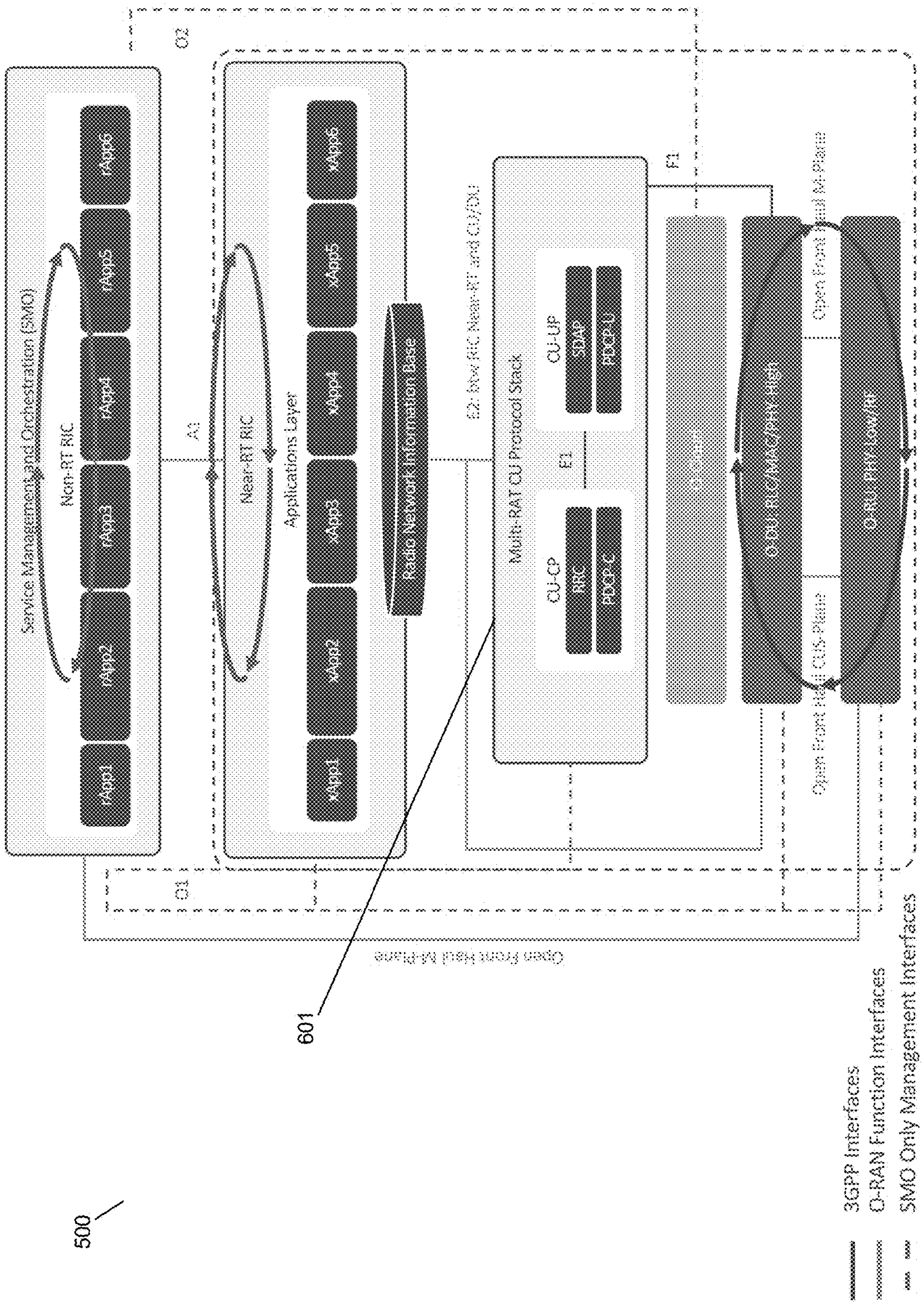
FIG. 5 is a further schematic diagram of a multi-RAT RAN deployment architecture, in accordance with some embodiments.

FIG. 5 is a further schematic diagram of a multi-RAT RAN deployment architecture, in accordance with some embodiments. A multi-RAT CU protocol stack 501 is configured as shown and enables a multi-RAT CU-CP and multi-RAT CU-UP, performing RRC, PDCP, and SDAP for all-G. As well, some portion of the base station (DU or CU) may be in the cloud or on COTS hardware (O-Cloud), as shown. Coordination with SMO and the all-G near-RT RIC and the all-G non-RT RIC may be performed using the A1 and O2 function interfaces, as shown and elsewhere as specified by the ORAN and 3GPP interfaces for 4G/5G.

Other elements and/or modules may also be included, such as a home eNodeB, a local gateway (LGW), a self-organizing network (SON) module, or another module. Additional radio amplifiers, radio transceivers and/or wired network connections may also be included.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the 5G standard, one of skill in the art would understand that these systems and methods could be adapted for use with other wireless standards or versions thereof. In addition to supporting the 5G protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony. The inventors have understood and appreciated that the present disclosure could be used in conjunction with various network architectures and technologies. Wherever a 5G technology is described, the inventors have understood that other RATs have similar equivalents, such as a eNodeB for 4G equivalent of gNB.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method of Physical Uplink Control Channel (PUCCH) power control, comprising:

defining, by a base station, a base format for a PUCCH based on established relationships with different formats of PUCCH configured in the network; and measuring, by the base station, an acceptable Signal-to-Interference-plus-Noise Ratio (SINR), $SINR_{PUCCH\_FORMAT\_x}$, for PUCCH formats $x \in \{0, \ldots, 4\}$ over a varying channel, wherein the PUCCH format with the minimum $SINR_{PUCCH\_FORMAT\_x}$ for the following PUCCH calculations is defined as the base format for the PUCCH:

$$PUCCH\_FORMAT\_BASE = PUCCH\_FORMAT\_X$$

with $SINR_{fx} = SINR_{fbase}$ where, $SINR_{fbase} = \min\{SINR_{f0}, SINR_{f1}, SINR_{f2}, SINR_{f3}, SINR_{f4}\}$.

2. The method of claim 1, further comprising calculating PUCCH format-specific offset, $$\Delta_{F_{PUCCH}}^{fx},$$

for one or more of the PUCCH formats using the following equation:

$$\Delta_{F_{PUCCH}}^{fx} = SINR_{fx} - SINR_{fbase} \text{ format } x \in \{0 \ldots 4\}.$$

3. The method of claim 2, further comprising configuring a PUCCH-PowerControl information element based on the $$\Delta_{F_{PUCCH}}^{fx}.$$

4. The method of claim 2, further comprising:

receiving respective SINR measurements for one or more PUCCH formats; and normalizing the SINR measurements for the one or more PUCCH formats using a corresponding PUCCH format-specific offset, $$\Delta_{F_{PUCCH}}^{fx}.$$

5. The method of claim 4, further comprising converting the normalized SINR measurements for the one or more PUCCH formats to an effective SINR for the base format for the PUCCH using the following equation:

$$EffSINR_{fbase}(t) = ReportedEffSINR_{fx}(t) - \Delta_{F_{PUCCH}}^{fx} \text{ [dB]}.$$

6. The method of claim 5, based on how the effective SINR for the base format for the PUCCH compares to a target SINR, transmitting a Transmit Power Control (TPC) command to a UE to cause the UE to adjust its transmit power.

7. The method of claim 6, wherein transmitting a TPC command to a UE to cause the UE to adjust its transmit power includes at least one of:

transmitting a first TPC command to the UE to cause the UE to increase its transmit power based on the effective SINR for the base format for the PUCCH being lower than the target SINR; and transmitting a second TPC command to the UE to cause the UE to decrease its transmit power based on the effective SINR for the base format for the PUCCH being higher than the target SINR.

8. A system for Physical Uplink Control Channel (PUCCH) power control, comprising:

a base station, including a memory and a processor, coupled to a user equipment (UE), wherein the base station is configured to:

define a base format for a PUCCH based on established relationships with different formats of PUCCH configured in the network; and measure an acceptable Signal-to-Interference-plus-Noise Ratio (SINR), $SINR_{PUCCH\_FORMAT\_x}$, for PUCCH formats $x \in \{0, \ldots, 4\}$ over a varying channel, wherein the PUCCH format with the minimum $SINR_{PUCCH\_FORMAT\_x}$ for the following PUCCH calculations is defined as the base format for the PUCCH:

$$PUCCH\_FORMAT\_BASE = PUCCH\_FORMAT\_X$$

with $SINR_{fx} = SINR_{fbase}$ where, $SINR_{fbase} = \min\{SINR_{f0}, SINR_{f1}, SINR_{f2}, SINR_{f3}, SINR_{f4}\}$.

9. The system of claim 8, wherein the base station is further configured to calculate PUCCH format-specific offset, $$\Delta_{F_{PUCCH}}^{fx},$$

for one or more of the PUCCH formats using the following equation:

$$\Delta_{F_{PUCCH}}^{fx} = SINR_{fx} - SINR_{fbase} \text{ format } fx \in \{0 \ldots 4\}.$$

10. The system of claim 9, wherein the base station is further configured to configure a PUCCH-PowerControl information element based on the $$\Delta_{F_{PUCCH}}^{fx}.$$

11. The system of claim 9, wherein the base station is further configured to:

receive respective SINR measurements for one or more PUCCH formats; and normalize the SINR measurements for the one or more PUCCH formats using a corresponding PUCCH format-specific offset, $$\Delta_{F_{PUCCH}}^{fx}.$$

12. The system of claim 11, wherein the base station is further configured to convert the normalized SINR measurements for the one or more PUCCH formats to an effective SINR for the base format for the PUCCH using the following equation:

$$EffSINR_{fbase}(t) = ReportedEffSINR_{fx}(t) - \Delta_{F_{PUCCH}}^{fx} \text{[dB]}.$$

13. The system of claim 12, wherein the base station is further configured to, based on how the effective SINR for the base format for the PUCCH compares to a target SINR, transmit a Transmit Power Control (TPC) command to a UE to cause the UE to adjust its transmit power.

14. The system of claim 13, wherein transmit a Transmit Power Control (TPC) command to a UE to cause the UE to adjust its transmit power includes at least one of:

transmit a first TPC command to the UE to cause the UE to increase its transmit power based on the effective SINR for the base format for the PUCCH being lower than the target SINR; and transmit a second TPC command to the UE to cause the UE to decrease its transmit power based on the effective SINR for the base format for the PUCCH being higher than the target SINR.

15. A non-transitory computer-readable medium comprising instructions for Physical Uplink Control Channel (PUCCH) power control, which, when executed, cause a base station to perform steps comprising:

defining, by the base station, a base format for a PUCCH based on established relationships with different formats of PUCCH configured in the network; and measuring, by the base station, an acceptable Signal-to-Interference-plus-Noise Ratio (SINR), $SINR_{PUCCH\_FORMAT\_x}$, for PUCCH formats $x \in \{0, \ldots, 4\}$ over a varying channel, wherein the PUCCH format with the minimum $SINR_{PUCCH\_FORMAT\_x}$ for the following PUCCH calculations is defined as the base format for the PUCCH:

$$\text{PUCCH\_FORMAT\_BASE=PUCCH\_FORMAT\_}X$$

with $SINR_{fx}=SINR_{fbase}$ where, $SINR_{fbase}=\min\{SINR_{f0}, SINR_{f1}, SINR_{f2}, SINR_{f3}, SINR_{f4}\}$.

16. The non-transitory computer-readable medium of claim 15, further comprising instructions, which when executed, cause the base station to perform steps comprising calculating PUCCH format-specific offset, $$\Delta_{F_{PUCCH}}^{fx},$$

for one or more of the PUCCH formats using the following equation:

$$\Delta_{F_{PUCCH}}^{fx} = SINR_{fx} - SINR_{fbase} \text{ format } x \in \{0 \ldots 4\}.$$

17. The non-transitory computer-readable medium of claim 16, further comprising instructions, which when executed, cause the base station to perform steps comprising configuring a PUCCH-PowerControl information element based on the $$\Delta_{F_{PUCCH}}^{fx}.$$

18. The non-transitory computer-readable medium of claim 16, further comprising instructions, which when executed, cause the base station to perform steps comprising:

receiving respective SINR measurements for one or more PUCCH formats; and normalizing the SINR measurements for the one or more PUCCH formats using a corresponding PUCCH format-specific offset, $$\Delta_{F_{PUCCH}}^{fx}.$$

19. The non-transitory computer-readable medium of claim 18, further comprising instructions, which when executed, cause the base station to perform steps comprising:

converting the normalized SINR measurements for the one or more PUCCH formats to an effective SINR for the base format for the PUCCH using the following equation:

$$EffSINR_{fbase}(t) = fSINR_{fx}(t) - \Delta_{F_{PUCCH}}^{fx} \text{[dB]};$$

based on how the effective SINR for the base format for the PUCCH compares to a target SINR, transmitting a Transmit Power Control (TPC) command to a UE to cause the UE to adjust its transmit power.

20. The non-transitory computer-readable medium of claim 19, wherein transmitting a TPC command to a UE to cause the UE to adjust its transmit power includes at least one of:

transmitting a first TPC command to the UE to cause the UE to increase its transmit power based on the effective SINR for the base format for the PUCCH being lower than the target SINR; and transmitting a second TPC command to the UE to cause the UE to decrease its transmit power based on the effective SINR for the base format for the PUCCH being higher than the target SINR.

* * * * *